(12) United States Patent
Berry et al.

(10) Patent No.: US 9,858,377 B2
(45) Date of Patent: Jan. 2, 2018

(54) CONSTRAINT-DRIVEN PIN OPTIMIZATION FOR HIERARCHICAL DESIGN CONVERGENCE

(71) Applicant: International Business Machines Corporation, Armonk, NY (US)

(72) Inventors: Christopher J. Berry, Hudson, NY (US); Randall J. Darden, Ridgedale, MO (US); Adam R. Jatkowski, Bethlehem, PA (US); Joseph J. Palumbo, Poughkeepsie, NY (US); Shyam Ramji, Lagrangeville, NY (US); Sourav Saha, Kolkata (IN); Timothy A. Schell, San Diego, CA (US); Eddy St. Juste, Bridgeport, CT (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 14/936,920

(22) Filed: Nov. 10, 2015

(65) Prior Publication Data

US 2017/0132349 A1    May 11, 2017

(51) Int. Cl.
*G06F 17/50* (2006.01)

(52) U.S. Cl.
CPC ...... *G06F 17/5072* (2013.01); *G06F 17/5081* (2013.01); *G06F 17/505* (2013.01); *G06F 17/5031* (2013.01)

(58) Field of Classification Search
CPC ............. G06F 17/5081; G06F 17/5072; G06F 17/5031; G06F 17/505

USPC .......... 716/113, 104, 108, 122, 123; 703/16
See application file for complete search history.

(56) References Cited

U.S. PATENT DOCUMENTS

| | | | | |
|---|---|---|---|---|
| 5,953,236 A | * | 9/1999 | Hossain | G06F 17/5072 716/104 |
| 6,014,506 A | * | 1/2000 | Hossain | G06F 17/5072 716/103 |
| 6,298,248 B1 | | 10/2001 | Miyoshi et al. | |
| 6,510,542 B1 | * | 1/2003 | Kojima | G06F 17/505 716/114 |
| 7,577,933 B1 | | 8/2009 | Wu et al. | |
| 7,793,247 B1 | * | 9/2010 | Duthou | G06F 17/5068 716/113 |

(Continued)

OTHER PUBLICATIONS

Anonymous, "Context Aware Pin Inboarding Techniques for faster and better timing convergence in Large Block Synthesis Process", IPCOM000220157D, Jul. 24, 2012, pp. 1-6.

(Continued)

*Primary Examiner* — Phallaka Kik
(74) *Attorney, Agent, or Firm* — Cantor Colburn LLP (57) ABSTRACT

A computer-implemented method of performing physical synthesis in a chip design process using hierarchical wire-pin co-optimization, a system, and a computer program product are described. Aspects include providing an indication of candidate pins among a plurality of pins of a plurality of macros that may be moved, and providing constraints on a range of movement of one or more of the plurality of pins. Aspects also include performing macro-level physical synthesis at each of the plurality of macros based on the candidate pins and the constraints to generate pin locations and timing results.

19 Claims, 6 Drawing Sheets

(56) References Cited

U.S. PATENT DOCUMENTS

| | | | |
|---|---|---|---|
| 7,971,174 B1 | 6/2011 | Khalsa et al. | |
| 7,992,119 B1* | 8/2011 | Iotov | G06F 17/5054 |
| | | | 716/116 |
| 8,234,615 B2 | 7/2012 | Ramji et al. | |
| 8,271,920 B2 | 9/2012 | Cho et al. | |
| 8,302,056 B2 | 10/2012 | Gaugler et al. | |
| 8,397,190 B2 | 3/2013 | Kenney et al. | |
| 8,631,369 B1* | 1/2014 | Kariat | G06F 17/5036 |
| | | | 716/101 |
| 8,984,464 B1* | 3/2015 | Mihal | G06F 17/5072 |
| | | | 716/118 |
| 9,053,285 B2 | 6/2015 | Darden et al. | |
| 9,064,077 B2 | 6/2015 | Samadi et al. | |
| 9,529,951 B2* | 12/2016 | Gristede | G06F 17/505 |
| 9,536,030 B2* | 1/2017 | Fricke | G06F 17/5072 |
| 2001/0049815 A1* | 12/2001 | Shinomiya | G06F 17/5068 |
| | | | 716/122 |
| 2005/0076319 A1 | 4/2005 | Chow et al. | |
| 2008/0066039 A1* | 3/2008 | Berry | G06F 17/5045 |
| | | | 257/773 |
| 2009/0193377 A1* | 7/2009 | Puri | G06F 17/5077 |
| | | | 716/119 |
| 2009/0224356 A1 | 9/2009 | Chandra | |
| 2011/0145775 A1* | 6/2011 | Sano | G06F 17/5068 |
| | | | 716/122 |
| 2012/0180017 A1* | 7/2012 | Kucar | G06F 17/5072 |
| | | | 716/129 |
| 2012/0290995 A1* | 11/2012 | Ellavsky | G06F 17/505 |
| | | | 716/119 |
| 2015/0186589 A1 | 7/2015 | Jayakumar et al. | |
| 2015/0347641 A1* | 12/2015 | Gristede | G06F 17/5022 |
| | | | 716/104 |
| 2015/0347665 A1* | 12/2015 | Sapatnekar | G06F 17/5081 |
| | | | 716/115 |
| 2015/0363531 A1* | 12/2015 | Fricke | G06F 17/5072 |
| | | | 716/135 |
| 2017/0004240 A1* | 1/2017 | Rashingkar | G06F 17/5072 |
| 2017/0011162 A1* | 1/2017 | Berry | G06F 17/5081 |
| 2017/0011163 A1* | 1/2017 | Berry | G06F 17/5081 |

OTHER PUBLICATIONS

Wu et al., "Bus-Pin-Aware Bus-Driven Floorplanning", GLSVLSI'10, May 16-18, 2010, pp. 1-6.

List of IBM Patents or Patent Applications Treated as Related; (Appendix P), Filed Nov. 10, 2015; 2 pages.

Christopher J. Berry et al., "Hierarchical Wire-Pin Co-Optimization", U.S. Appl. No. 14/794,871, filed Jul. 9, 2015.

Christopher J. Berry et al., "Hierarchical Wire-Pin Co-Optimization", U.S. Appl. No. 14/879,186, filed Oct. 9, 2015.

* cited by examiner

CONSTRAINT-DRIVEN PIN OPTIMIZATION FOR HIERARCHICAL DESIGN CONVERGENCE

BACKGROUND

The present invention relates to chip design, and more specifically, to constraint-driven pin optimization for hierarchical design convergence.

Part of the process of obtaining a physical implementation of a chip design involves pin placement. A chip is typically organized hierarchically. Pin (or wire-pin) placement is part of the physical synthesis step in chip design and refers to the placement of pins, which are boundary connections between hierarchies. The higher level hierarchy may be referred to as the unit level, and the lower levels may be referred to as macro levels (blocks) for explanatory purposes. Generally, each macro has boundary conditions that are given as inputs to physical synthesis. In the early stage of design, referred to as floor planning, pin locations may be defined. These pin locations may be iteratively changed to converge on a final design and physical implementation that meets timing and other requirements for the chip.

SUMMARY

Embodiments include a computer-implemented method of performing physical synthesis in a chip design process using hierarchical wire-pin co-optimization, a system, and a computer program product. The method includes providing, using a processor implementing a unit level controller, an indication of candidate pins among a plurality of pins of a plurality of macros that may be moved; providing, using the processor, constraints on a range of movement of one or more of the plurality of pins; and performing macro-level physical synthesis at each of the plurality of macros based on the candidate pins and the constraints to generate pin locations and timing results.

DETAILED DESCRIPTION

As noted above, physical synthesis of a chip design includes the process of iteratively adjusting pin locations. These adjustments are presently made based on boundary conditions and on timing requirements. As chips become more complex, more levels of hierarchy result. High frequency chips require pin co-optimization across levels of hierarchy. Embodiments of the systems and methods detailed herein relate to additionally applying constraints on the pin adjustments. The constraints are generated at the unit level and need not all be applied together at the same stage of physical synthesis. The constraints provide an indication of relative rank with respect to range of movement of each pin. As the design improves over iterations (e.g., timing requirements are met in more portions of the chip design), the constraints become tighter such that less movement of pins is permitted. In this way, the design is made to converge to a final physical implementation.

Figure 1:
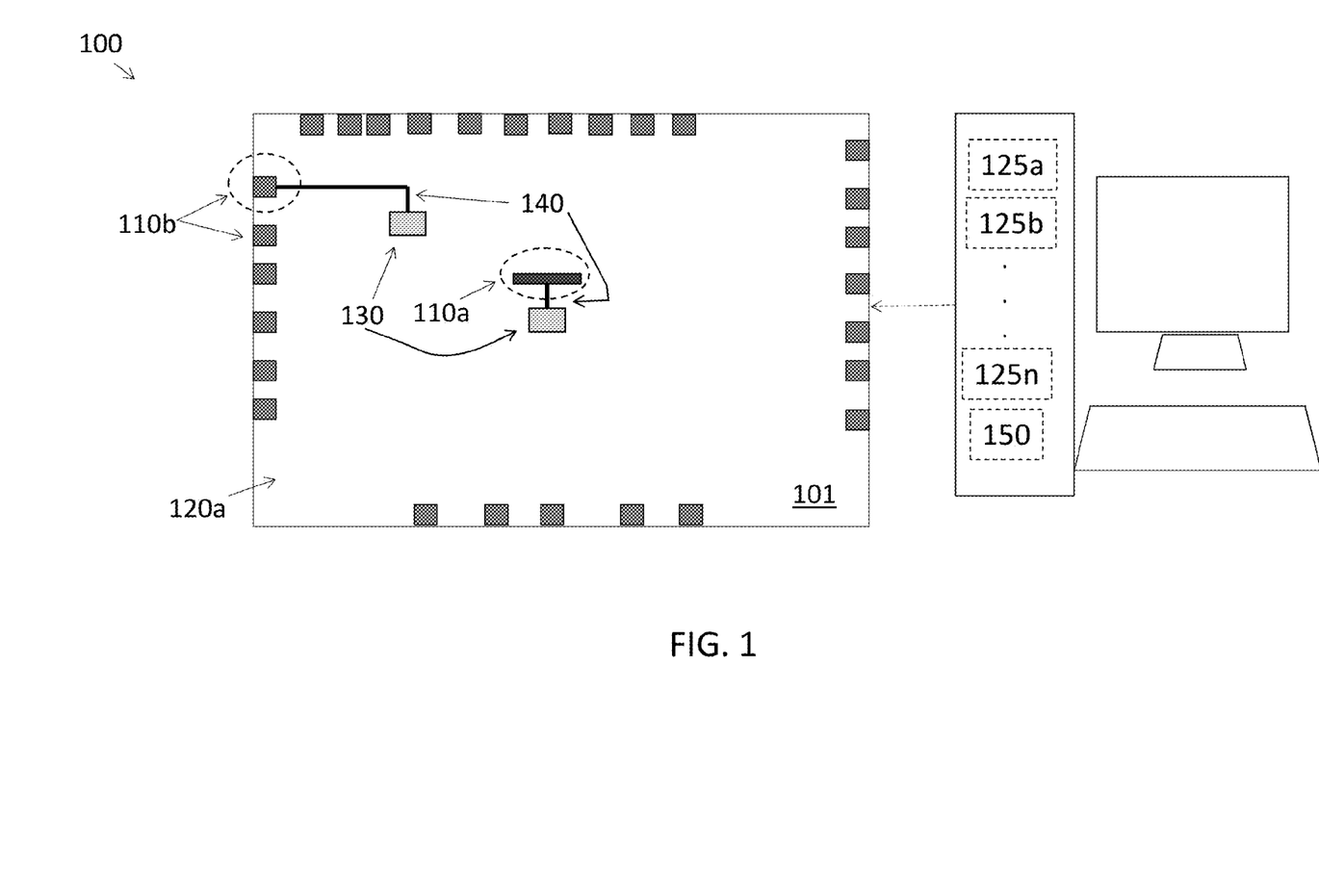
FIG. 1 is a perspective top-down view of a unit within a chip designed according to embodiments.

FIG. 1 is a perspective top-down view of a unit 101 within a chip 100 designed according to embodiments discussed herein. From the perspective of FIG. 1, only the top metal layer 120a is visible with other metal layers 120 being below the top metal layer 120a. As noted above, chip 100 design may be hierarchical, with top level units 101. Unit design may be subdivided into a number of macros 250 (FIG. 2), each of which includes a number of metal layers 120. An interior pin 110a is shown connected to a component 130 (e.g., macro 250, device, logic gate), and a boundary pin 110b is shown connected to another component 130. The wires 140 shown in this top metal layer 120a are likely to be thicker than those in lower metal layers 120. The wires 140 connect a source component 130 to a sink component 130 in another macro 250 through a pin 110. A unit level controller 150 ultimately controls the placement of all the pins in all of the macros 250 to meet timing and boundary constraints. According to embodiments detailed below, the unit level controller 150 is part of a hierarchical process of co-optimization of pin placement. The unit level controller 150 applies constraints on the pins 110 controlled by macro-level controllers 125. While the macro-level controllers 125 and unit level controller 150 are shown separately in FIG. 1, the physical synthesis at the macro level and the unit level may be performed by the same one or more processors using instructions from one or more memory devices.

Figure 2:
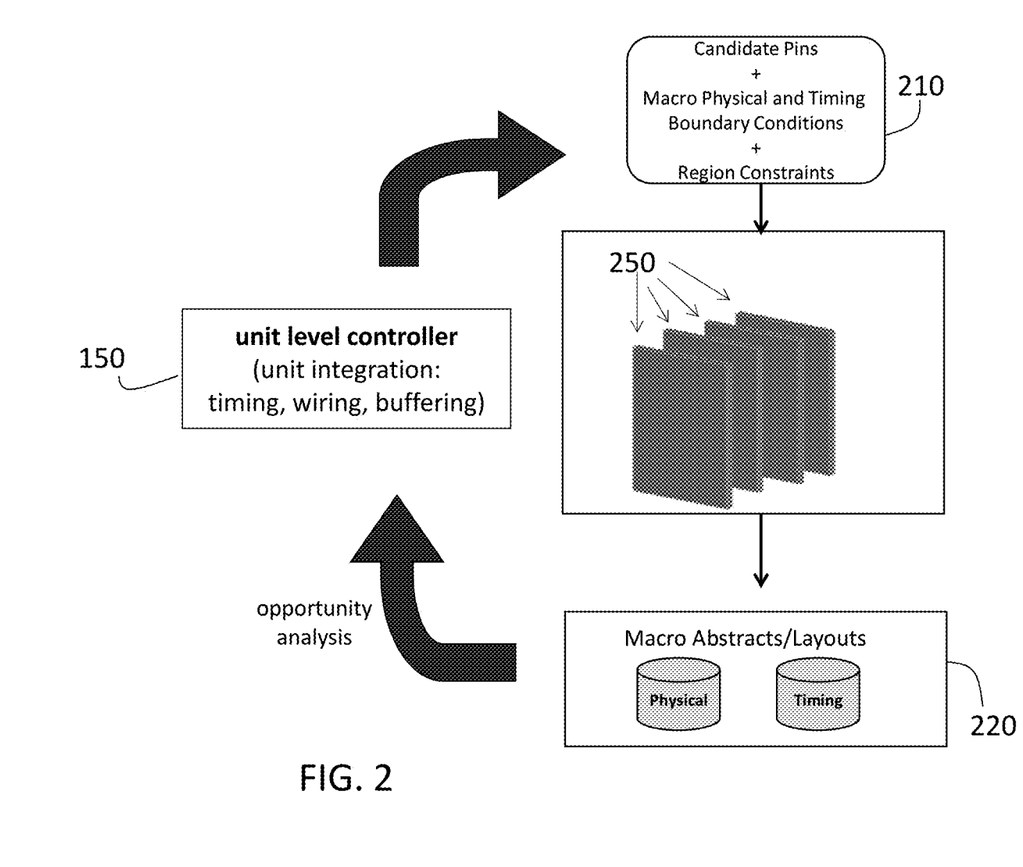
FIG. 2 is a flow diagram showing forward control by the unit level controller on the pin placement in each of the associated macros according to embodiments.

FIG. 2 is a flow diagram showing forward control by the unit level controller 150 on the pin placement in each of the associated macros 250 according to embodiments. FIG. 2 is a high-level view of the pin optimization process. At block 210, candidate pins 110 (pins 110 that are permitted to be moved by the macros 250) and macro physical and timing boundary conditions are provided by the unit level controller 150 to each of the macros 250. Region constraints are additionally provided, as discussed further below. The candidate pins 110 indicated by the unit level controller 250 and the pin 110 constraints provided by the unit level controller 150 need not be interdependent. That is, the unit level controller 150 may provide constraints pertaining to pins 110 that are not included among candidate pins 110 and, thus, may not be moved at the macro 250 level. The macro-level physical synthesis process is further discussed with reference to FIG. 3.

A result of the macro-level physical synthesis is the output (block 220) of updated pin 110 positions and timing information associated with those pin 110 positions. The macros 250 may additionally provide opportunity analysis to the unit level controller 150. The opportunity analysis indicates pins 110 that are suggested for inclusion among candidate pins 110 in a subsequent iteration. The output may be stored, as shown at block 220, in addition to being provided to the unit level controller 150. The unit level controller 150 integrates the outputs from the various macros 250 and, as needed, generates physical and timing boundary conditions and region constraints (block 210) for the next iteration of macro-level pin placement. The ultimate goal of the process controlled by the unit level controller 150 is to converge the macro-level designs to a unit level design that meets timing requirements without violating boundary conditions of any of the macros 250.

Figure 3:
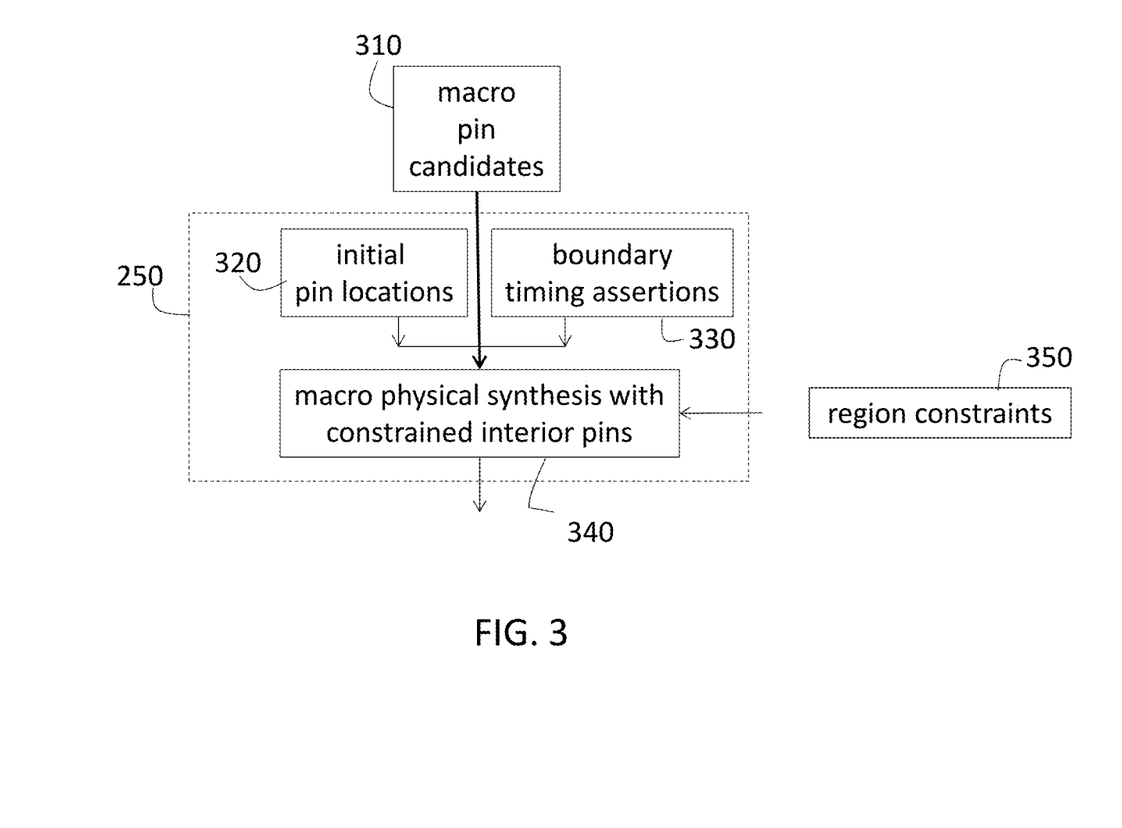
FIG. 3 shows the inputs to the macro-level physical synthesis process according to embodiments.

FIG. 3 shows the inputs to the macro-level physical synthesis process according to embodiments. Macro 250 pin 110 candidates (at block 310) are those pins 110 that are indicated by the unit level controller 150 as movable at the macro 250 level. Within each macro 250, the initial pin locations (at 320) are used along with boundary timing assertions (at 330) to perform macro-level physical synthesis (at 340). While the boundary timing assertions (at 330) are conventionally used, an additional input to the macro-level physical synthesis (at 340), according to embodiments detailed herein, is region constraints (block 350). These region constraints, discussed further below, aid in converging the macro-level designs to an optimized unit-level design. The convergence of the high-level design is aided by the constraints, which are provided by the unit level controller 150 and imposed by the macros 250, because pins 110 are prevented (constrained) from being moved to ultimately undesirable locations (e.g., locations that lead to degradation of the electrical characteristic of the wire, locations that lead to crisscrossed wires). Three types of constraints that may be included in the region constraints at block 350 are detailed below. All three types of constraints need not be included at each iteration of physical design.

Figure 4:
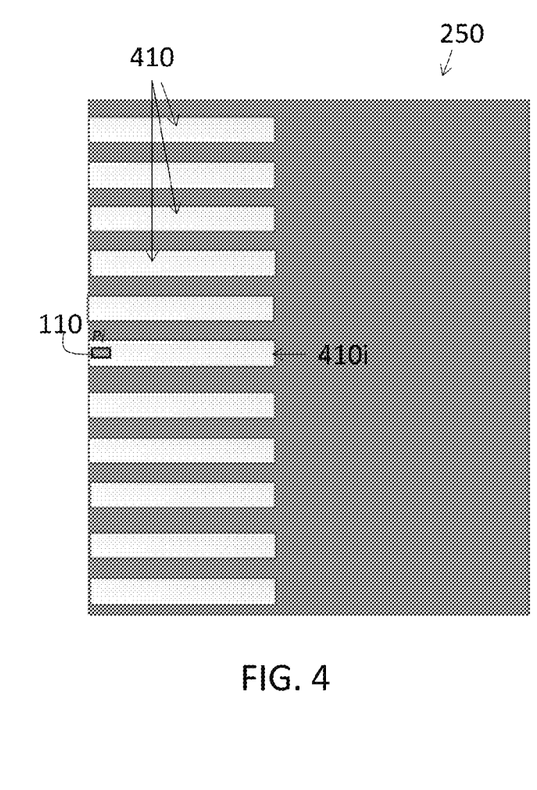
FIG. 4 illustrates the reach-based constraint on a pin in one dimension according to an embodiment.

One type of constraint imposed by the unit level controller 150 on each of the macros 250 is a reach-based region constraint (RRC). This constraint limits the region within which a pin Pi 110 may be moved in both one dimensional space and in two dimensional space (within the macro 250). FIG. 4 illustrates the reach-based constraint on a pin Pi 110 in one dimension according to an embodiment. FIG. 4 shows part of a macro 250 that includes the pin Pi 110. Each of the regions 410 illustrates the freedom of movement of the pin Pi 110 in one dimension. That is, for the exemplary pin Pi 110 shown in FIG. 4, the region 410i represents the one-dimensional range of movement indicated by the constraint.

Figure 5:
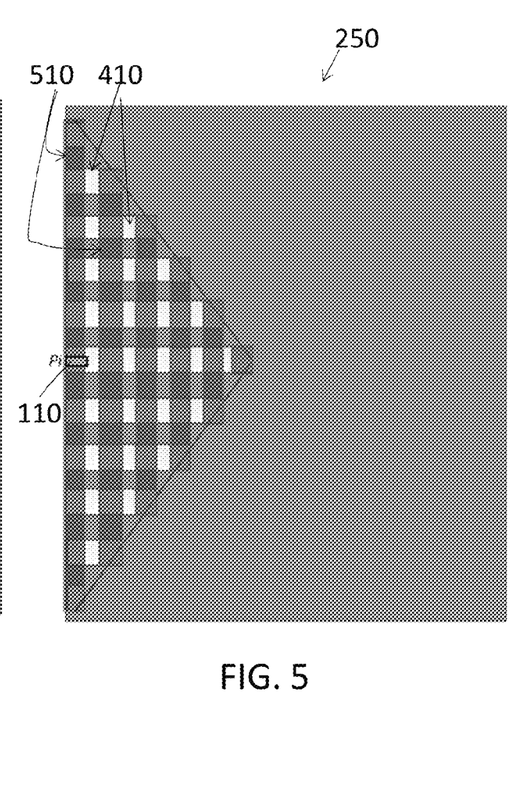
FIG. 5 illustrates the reach-based region constraint on a pin in two dimensions according to an embodiment.

FIG. 5 illustrates the reach-based constraint on a pin Pi 110 in two dimensions according to an embodiment. FIG. 5 shows part of a macro 250 that includes the pin Pi 110. FIG. 5 indicates that, as the exemplary pin Pi 110 shown in FIG. 5 is moved farther from its initial (shown) position in the vertical direction (according to the orientation shown in FIG. 5), then the freedom of movement in the horizontal direction (in FIG. 5) is reduced. That is, the vertical range 510 and the horizontal range 410 permitted by the unit level controller 150 for movement of the pin Pi 110 are interrelated. Accordingly, in FIG. 5, if the pin Pi 110 were not moved vertically at all, then the horizontal range 410 would be the same as the horizontal range 410i shown in FIG. 4. However, for each incremental movement of the pin Pi 110 in the vertical direction, the horizontal range 410 is incrementally reduced. Conversely, for each horizontal movement of the pin Pi 110 in the horizontal direction, the vertical range 510 is incrementally reduced. By limiting the range of movement of pins 110, the RRC acts to control wire 140 lengths and, thereby, reduces the possibility of changes in electrical characteristics of the wires 140.

Figure 6:
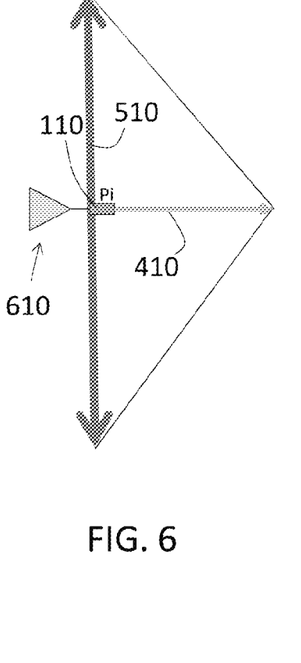
FIG. 6 shows an exemplary two-dimensional reach-based region constraint associated with an exemplary pin according to embodiments.

FIG. 6 shows the two-dimensional RRC associated with exemplary pin Pi 110 according to embodiments. The RRC is defined based on the wiring layer because the vertical range 510 and horizontal range 410 may be greater for higher layers, which may have thicker wires 140. During macro-level physical synthesis (block 340, FIG. 3), the RRC provided for candidate pins 110 of each macro 250 are intersected with wiring requirements (to make all the necessary connections) in order to select pin 110 placement locations. An exemplary driver or unit buffer 610 is shown accessing the exemplary pin Pi 110 in FIG. 6. As noted above, all of the different types of constraints need not be imposed at the same iterations of physical synthesis. In the case of RRC, the region constraints may be imposed relatively early in the design process and may be refined over the course of iterations.

Figure 7:
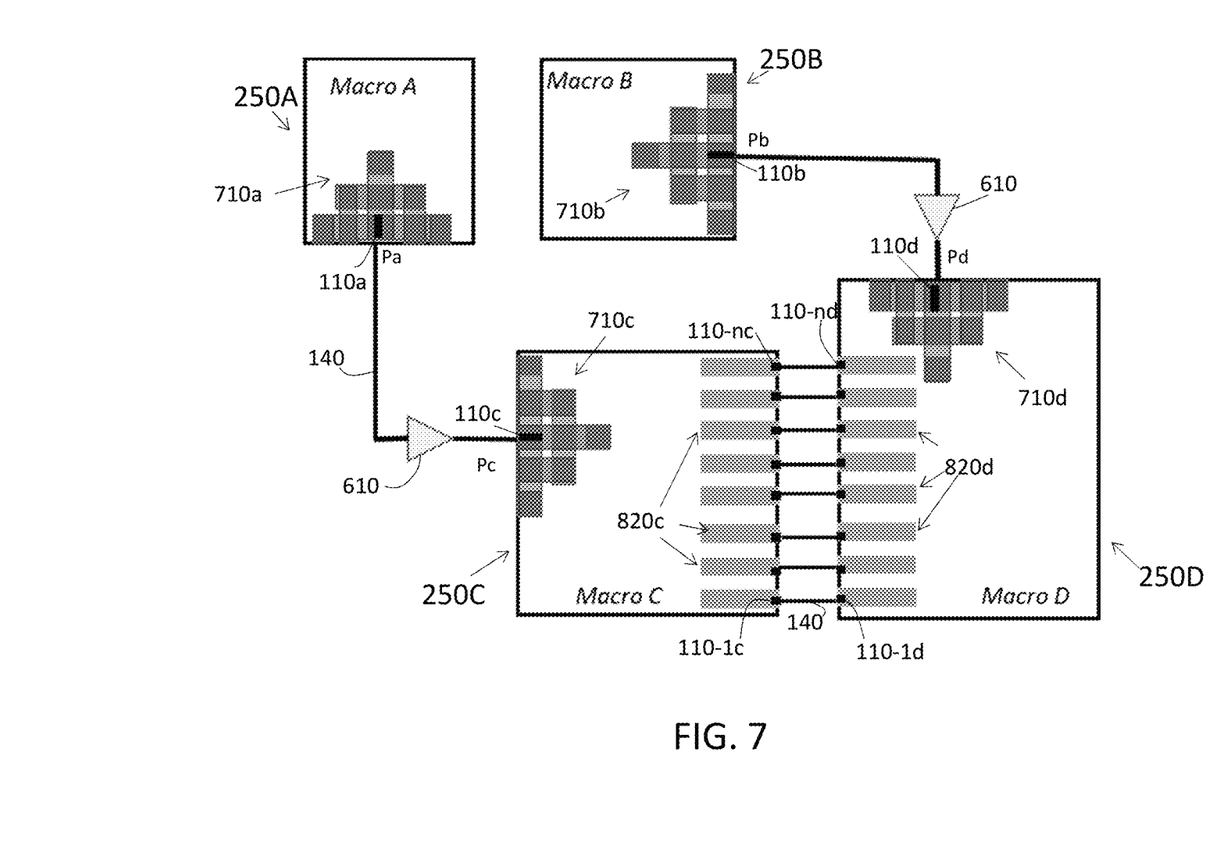
FIG. 7 illustrates both reach-based region constraints and wire-based region constraints according to embodiments.

Another type of constraint imposed by the unit level controller 150 is an alignment or wiring-based region constraint (WRC). FIG. 7 illustrates both RRC and WRC according to embodiments. The horizontal range 410 and vertical range 510 are indicated as the two-dimensional regions 710a, 710b, 710c, and 710d, respectively, for the pins Pa 110a, Pb 110b, Pc 110c, and Pd 110d. Pin Pa 110a located in macro A 250a connects to pin Pc 110c located in macro C 250c through a wire 140 and unit buffer 610, and pin Pb 110b in macro B 250b connects to pin Pd 110d in macro D 250d through another wire 140 and unit buffer 610. A set of wires 140 connect pins 110 on macro C 250c to pins 110 on macro D 250d. WRC are imposed on these pins 110 to ensure proper alignment of the wires 140 between them. For example, pin 110-1c on macro C 250c connects to pin 110-1d on macro D 250d, and pin 110-nc connects to pin 110-nd. The imposed WRC results in the wires 140 between the pins 110 being aligned as shown in FIG. 7. On the other hand, if, for example, pin 110-1d were allowed to be moved to the location shown for pin 110-nd, the wire 140 between pin 110-1c and (relocated) pin 110-1d would have to cross the other wires 140 between the other pins 110.

Thus, as shown in FIG. 7, constraining each of the pins 110 in macro C 250c that connects to pins 110 in macro D 250d to the respective ranges 820c and constraining each of the pins 110 in macro D 250d that connects to pins 110 in macro C 250c to the respective ranges 820d results in the alignment shown in FIG. 7. As FIG. 7 indicates, each of the ranges 820c, 820d is one dimensional such that the pins 110 are constrained from moving vertically (based on the exemplary orientation shown in FIG. 7). While the WRC is indicated as ranges 820 for explanatory purposes, these one-dimensional constraints are akin to the one-dimensional range 410 in FIG. 4. That is, WRC further constrains RRC to a single dimension, as needed, to ensure alignment of pins 110 on different macros 250 that are connected by wires 140. The ranges 820c, 820d need not be the same length, unlike the example shown in FIG. 7. As noted with regard to the RRC, the unit level controller 150 may impose WRC during one, more, or all iterations of the macro-level physical synthesis.

Figure 8:
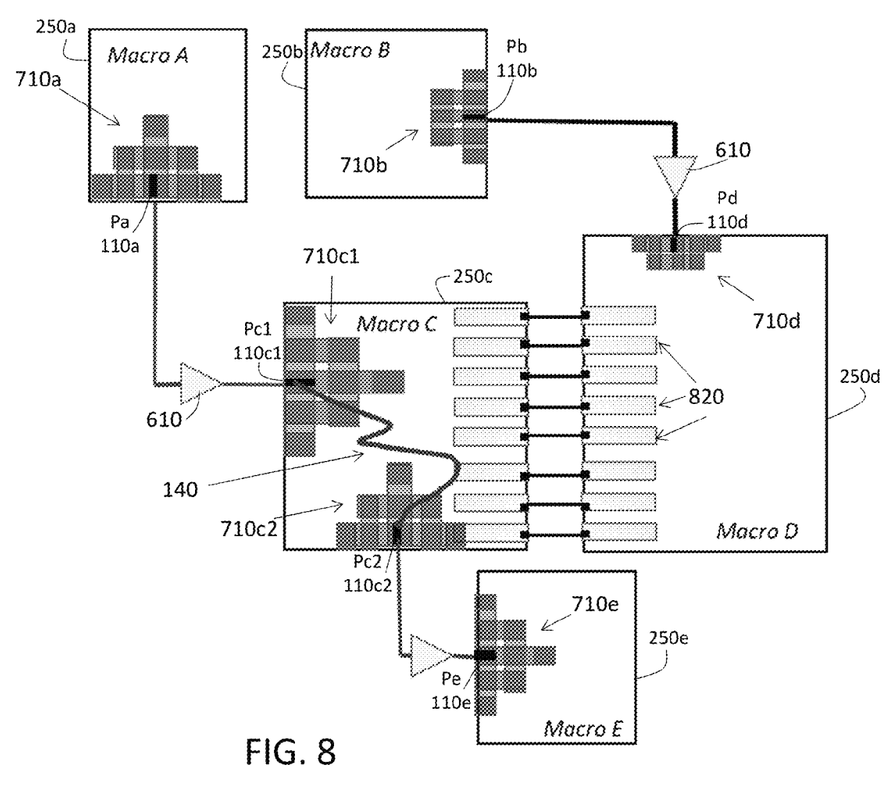
FIG. 8 illustrates reach-based region constraints, wire-based region constraints, and unit timing, wiring, and buffering based constraints according to embodiments.

A third type of constraint imposed by the unit level controller 150 on each of the macros 250 is a unit timing, wiring, and buffering based constraint (UTBC). FIG. 8 illustrates RRC, WRC, and UTBC according to embodiments. The UTBC functions to loosen or tighten RRC, as needed, to facilitate timing improvements in critical paths. For example, the path between pin Pb 110b in macro B 250b and pin Pd 110d in macro D 250d in FIG. 8 is non-critical with regard to unit timing and buffering. As a result, the RRC ranges 710b and 710d associated with the movement of pins Pb 110b and Pd 110d, respectively, are relatively small (tightly constrained). This is a result of the UTBC.

On the other hand, the path between pin Pc1 110c1 and pin Pc2 110c2 in macro C 250c is determined to be a critical section (delay) of the path. Accordingly, the ranges 710c1 and 710c2 associated with the movement of pins Pc1 110c1 and pin Pc2 110c2, respectively, are relatively larger (loosely constrained) to allow more freedom to improve the timing within macro C 250c associated with this path. The UTBC acts to tighten constraints (e.g., RRC and WRC) over the course of the design. That is, as more and more paths meet timing requirements and are deemed non-critical, the UTBC acts to decrease the freedom of movement of more and more pins 110 while allowing greater freedom to move pins 110 that are associated with critical paths (paths not meeting the timing requirements). In this way, by increasingly constraining macro-level design over the iterative stages, the UTBC facilitates convergence to an optimized physical implementation at the unit level. The UTBC need not be imposed in conjunction with RRC or WRC. Instead, even without any particular range constraints on the pins 110, the UTBC acts to constrain relative freedoms of movement.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of performing physical synthesis in a chip design process using hierarchical wire-pin co-optimization, the method comprising:
providing, using a processor implementing a unit level controller, an indication of candidate pins among a plurality of pins of a plurality of macros, the candidate pins being permitted to be moved and the plurality of macros being part of a unit that includes the unit level controller such that the unit is at a higher hierarchical level than the plurality of macros;
providing, using the processor implementing the unit level controller, constraints on a range of movement of one or more of the plurality of pins; and
performing macro-level physical synthesis at each of the plurality of macros based on the candidate pins and the constraints provided by the unit level controller to generate pin locations and timing results, wherein the chip design resulting from the physical synthesis is used to fabricate an integrated circuit or cause the integrated circuit to be fabricated.

2. The computer-implemented method according to claim 1, further comprising providing, using the processor, physical and timing boundary conditions for the plurality of macros.

3. The computer-implemented method according to claim 1, wherein the providing the constraints includes providing one or more types of constraints.

4. The computer-implemented method according to claim 3, wherein the providing the constraints includes providing reach-based region constraints for at least one of the one or more of the plurality of pins, each reach-based region constraint limiting the movement of the respective at least one of the one or more of the plurality of pins to a two-dimensional range within the respective macro among the plurality of macros.

5. The computer-implemented method according to claim 3, wherein the providing the constraints includes providing wire-based region constraints for at least one of the one or more of the plurality of pins, each wiring-based region constraint limiting the movement of the respective at least one of the one or more of the plurality of pins to a range in one dimension within the respective macro among the plurality of macros to ensure alignment with another pin among the plurality of pins.

6. The computer-implemented method according to claim 3, wherein the providing the constraints includes providing unit timing, wiring, and buffering based constraints for at least one of the one or more of the plurality of pins, each unit timing, wiring, and buffering based constraint indicating relative freedom of the movement of the respective at least one of the one or more of the plurality of pins relative to others of the at least one of the one or more of the plurality of pins.

7. The computer-implemented method according to claim 6, wherein the unit timing, wiring, and buffering based constraints indicate a greater relative freedom of the movement for one of the at least one of the one or more of the plurality of pins associated with a more timing critical path than for another of the at least one of the one or more of the plurality of pins associated with a less timing critical path.

8. A system to perform physical synthesis in a chip design process using hierarchical wire-pin co-optimization, the system comprising:
a unit level controller of a unit configured to indicate candidate pins among a plurality of pins of a plurality of macros that may be moved and constraints on a range of movement of one or more of the plurality of pins, wherein the plurality of macros are part of the unit such that the unit is at a higher hierarchical level than the plurality of macros;

the plurality of macros configured to perform macro-level physical synthesis at each of the plurality of macros based on the candidate pins and the constraints to generate pin locations and timing; and a component configured to fabricate an integrated circuit resulting from the physical synthesis or cause the integrated circuit to be fabricated.

9. The system according to claim 8, wherein the unit level controller is further configured to provide physical and timing boundary conditions for the plurality of macros.

10. The system according to claim 8, wherein the unit level controller provides one or more types of constraints.

11. The system according to claim 10, wherein the unit level controller provides reach-based region constraints for at least one of the one or more of the plurality of pins, each reach-based region constraint limiting the movement of the respective at least one of the one or more of the plurality of pins to a two-dimensional range within the respective macro among the plurality of macros.

12. The system according to claim 10, wherein the unit level controller provides wire-based region constraints for at least one of the one or more of the plurality of pins, each wiring-based region constraint limiting the movement of the respective at least one of the one or more of the plurality of pins to a range in one dimension within the respective macro among the plurality of macros to ensure alignment with another pin among the plurality of pins.

13. The system according to claim 10, wherein the unit level controller provides unit timing, wiring, and buffering based constraints for at least one of the one or more of the plurality of pins, each unit timing, wiring, and buffering based constraint indicating relative freedom of the movement of the respective at least one of the one or more of the plurality of pins relative to others of the at least one of the one or more of the plurality of pins.

14. A computer program product for performing physical synthesis in a chip design process using hierarchical wire-pin co-optimization, the computer program product comprising a computer readable storage medium having program instructions embodied therewith, the program instructions executable by a processor to perform a method comprising:

providing, at a hierarchical level of a unit, an indication of candidate pins among a plurality of pins of a plurality of macros that may be moved, wherein the plurality of macros are part of the unit such that the plurality of macros is at a lower hierarchical level than the unit;

providing constraints on a range of movement of one or more of the plurality of pins; and performing macro-level physical synthesis at each of the plurality of macros based on the candidate pins and the constraints to generate pin locations and timing results, wherein the chip design resulting from the physical synthesis is used to fabricate an integrated circuit or cause the integrated circuit to be fabricated.

15. The computer program product according to claim 14, further comprising providing, using the processor, physical and timing boundary conditions for the plurality of macros.

16. The computer program product according to claim 14, wherein the providing the constraints includes providing one or more types of constraints.

17. The computer program product according to claim 16, wherein the providing the constraints includes providing reach-based region constraints for at least one of the one or more of the plurality of pins, each reach-based region constraint limiting the movement of the respective at least one of the one or more of the plurality of pins to a two-dimensional range within the respective macro among the plurality of macros.

18. The computer program product according to claim 16, wherein the providing the constraints includes providing wire-based region constraints for at least one of the one or more of the plurality of pins, each wiring-based region constraint limiting the movement of the respective at least one of the one or more of the plurality of pins to a range in one dimension within the respective macro among the plurality of macros to ensure alignment with another pin among the plurality of pins.

19. The computer program product according to claim 16, wherein the providing the constraints includes providing unit timing, wiring, and buffering based constraints for at least one of the one or more of the plurality of pins, each unit timing, wiring, and buffering based constraint indicating relative freedom of the movement of the respective at least one of the one or more of the plurality of pins relative to others of the at least one of the one or more of the plurality of pins.

* * * * *